Dec. 18, 1928.  1,695,817
H. T. NOYES
PRODUCTION OR MANUFACTURE OF DISKS OR BLANKS FOR BUTTONS
OR THE LIKE FROM IRREGULARLY SHAPED PIECES OF MATERIAL
Filed Dec. 29, 1922   2 Sheets-Sheet 1
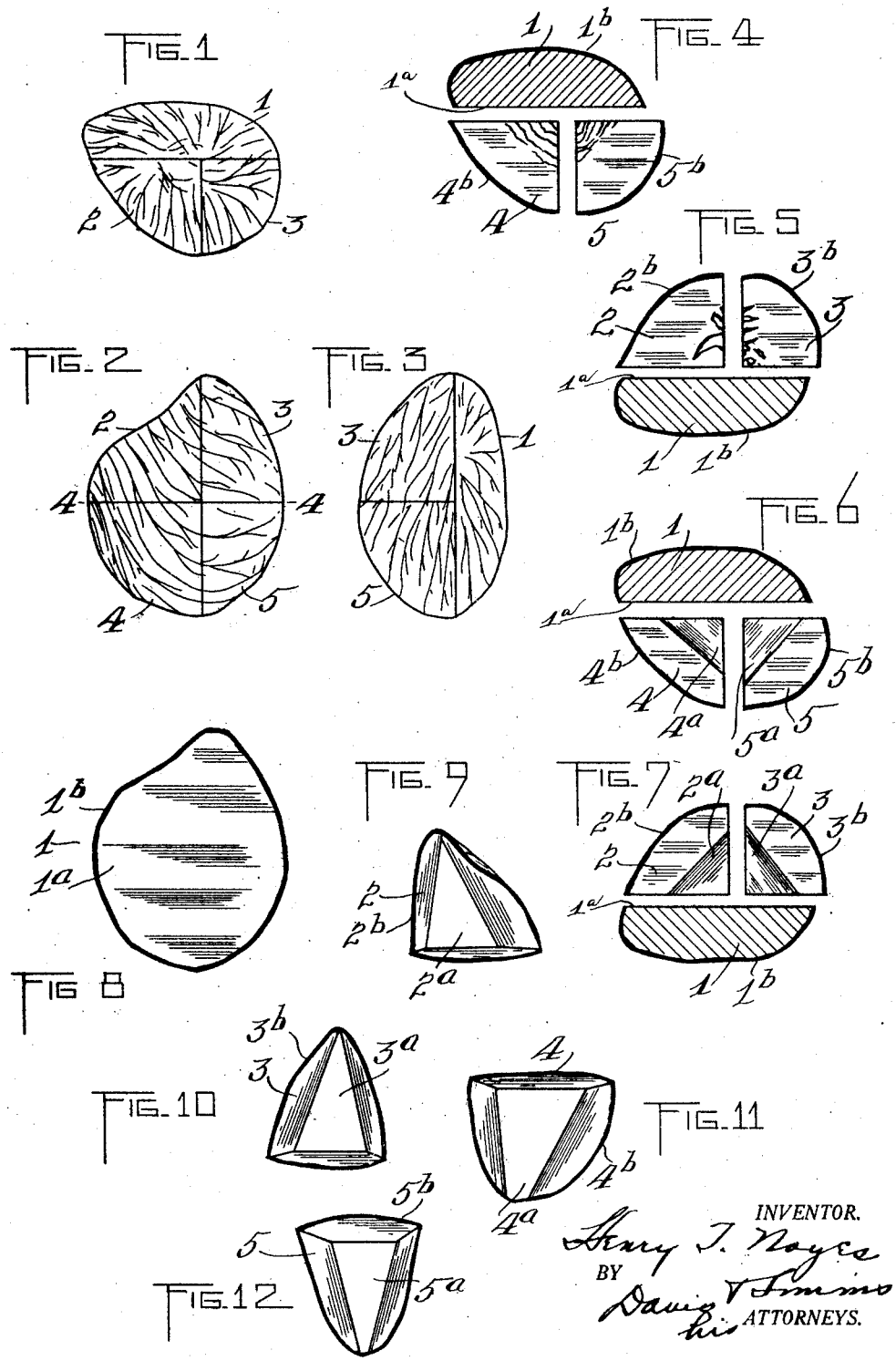
INVENTOR.
Henry T. Noyes
BY
Davis & Simms
his ATTORNEYS.

Dec. 18, 1928.　　　　　　　　　　　　　　　　　1,695,817
H. T. NOYES
PRODUCTION OR MANUFACTURE OF DISKS OR BLANKS FOR BUTTONS
OR THE LIKE FROM IRREGULARLY SHAPED PIECES OF MATERIAL
Filed Dec. 29, 1922　　　2 Sheets-Sheet 2
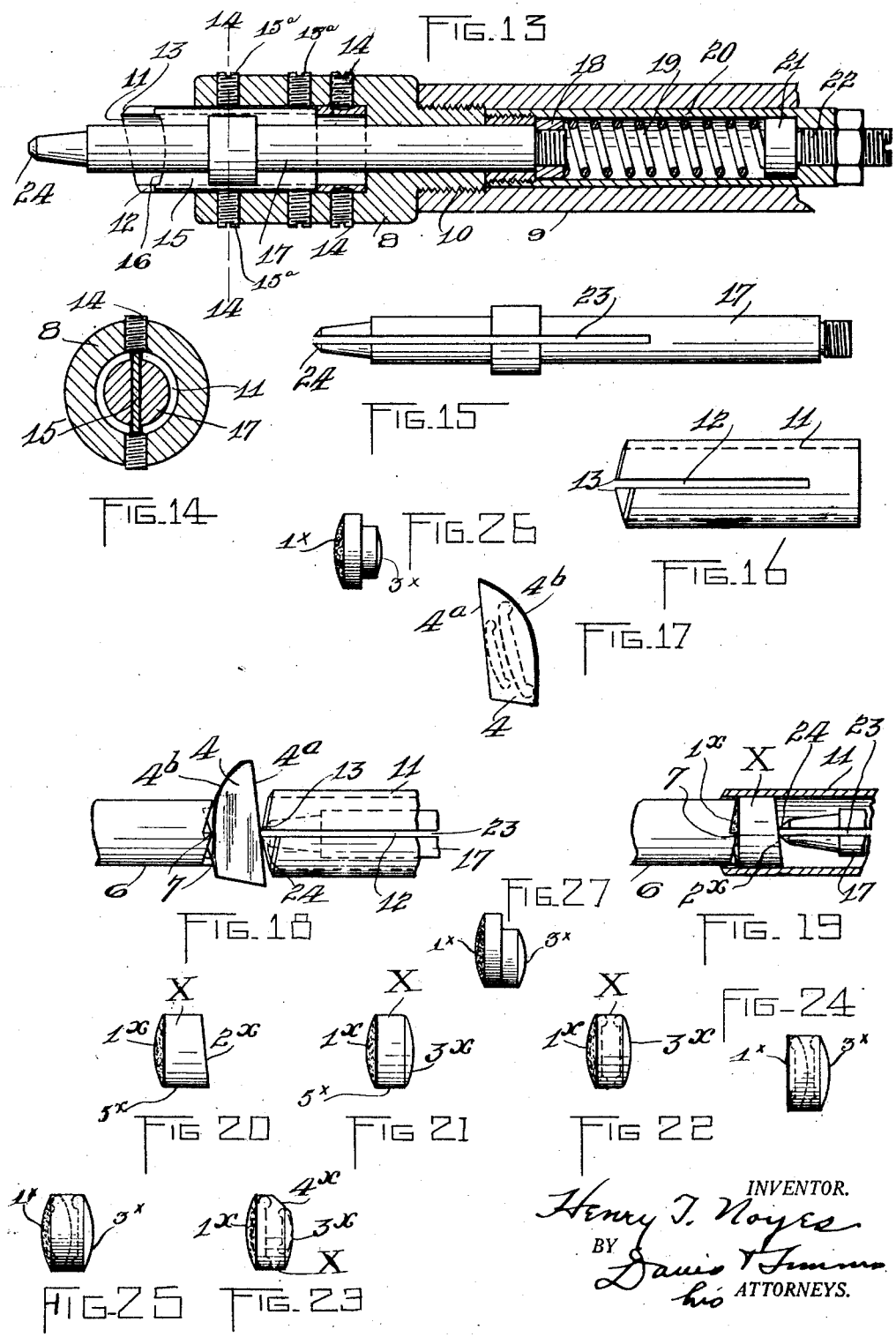

Patented Dec. 18, 1928.

1,695,817

UNITED STATES PATENT OFFICE.

HENRY T. NOYES, OF ROCHESTER, NEW YORK, ASSIGNOR TO ART IN BUTTONS INCORPORATED, OF ROCHESTER, NEW YORK, A CORPORATION OF NEW YORK.

PRODUCTION OR MANUFACTURE OF DISKS OR BLANKS FOR BUTTONS OR THE LIKE FROM IRREGULARLY-SHAPED PIECES OF MATERIAL.

Application filed December 29, 1922. Serial No. 609,715.

The present invention relates to the production or manufacture of disks, or blanks for buttons, or the like, from irregularly shaped pieces of material. An object of the invention is to provide a method of manufacture which will do away with the necessity for accurate classification of the irregularly shaped pieces and reduce waste of material. A further object of the invention is to convert irregularly shaped pieces of material which has superior quality adjacent one side thereof into pieces each capable of producing articles as close as possible to said superior side. A still further object of the invention is to convert the irregularly shaped pieces into pieces still retaining the maximum possibilities in disks, or blanks for buttons, or the like, of the original irregularly shaped pieces and preferably having a form which is mechanically and accurately measurable. A still further object of the invention is to provide a converted piece having uniformity in shape and a finished surface thereon through which the piece may be automatically and mechanically handled in the various operations in the method of producing the articles contained therein. Still another object of the invention is to provide converted pieces each with a surface extending transversely of the axis of the piece to act as a gauging surface by means of which the pieces may be measured mechanically as to maximum possibilities in disks, or blanks for buttons, or the like. Another and still further object of the invention is to provide the converted pieces each with an original surface side of the irregularly shaped piece and a formed surface on the side opposite to such original surface side at a fixed distance from the plane of the original surface side and substantially parallel with said plane, and to accurately measure such pieces by mechanical means for the maximum possibilities in buttons, or other articles obtainable therefrom. Another and still further object of the invention is to separate those converted pieces with incomplete article forming portions from those with complete article forming portions and to recut those with incomplete article forming portions to provide complete article forming portions, of a smaller size. Still another and further object of the invention is to positively classify the converted pieces to separate those pieces most suitable for forming on each a convex surface in immediate proximity to the original surface side from those most suitable for forming a flat or concave surface in immediate proximity to the original surface side. A still further object of the invention is to so cut the material from which the converted piece is to be formed that the article or articles in the converted piece may be selectively positioned with reference to an original surface side of the material.

To these and other ends, the invention consists of certain steps and combinations of steps in a method of producing disks, or blanks for buttons, or the like, from irregularly shaped pieces of material, as well as in certain new features in a converted piece, all of which will be hereinafter described and the novel features pointed out in the appended claims.

In the drawings:

Figs. 1, 2 and 3 are views of three sides of a so-called "ivory" nut, the straight lines showing typical saw cuts made through such nut;

Fig. 4 is a separated section on the line 4—4, Fig. 2;

Fig. 5 is a separated section on the same line looking in the opposite direction;

Fig. 6 is a separated section showing the manner in which sawed faces may be provided on the parts illustrated in Fig. 4;

Fig. 7 is a similar view showing the manner in which sawed faces may be provided on the parts shown in Fig. 5;

Figs. 8 to 12, inclusive, are views of five of the irregularly shaped pieces of the nut;

Fig. 13 is a longitudinal section through a part of the devices for forming the converted pieces;

Fig. 14 is a section on the line 14—14, Fig. 13;

Fig. 15 is a detail view of the holding tool;

Fig. 16 is a detail view of the tubular cutter;

Fig. 17 is a detail view of an irregularly shaped piece, illustrating the manner in which two buttons, one of which is large, may be obtained from the piece according to the present invention.

Fig. 18 shows the manner in which the irregularly shaped piece is held to be cut or formed according to the present invention;

Fig. 19 is a view showing the manner in which the gauging points cooperate with the irregularly shaped piece within the area of the proposed blank and the tubular cutter passes about the gauging points in cutting the converted piece;

Fig. 20 is a side view of one of the converted pieces without a finished transverse surface thereon;

Fig. 21 shows a converted piece with a finished surface extending transversely of the axis of the piece;

Fig. 22 shows a manner in which two buttons may be formed from a converted piece;

Fig. 23 shows a manner in which two buttons may be formed from another converted piece;

Fig. 24 is a detail view showing a manner in which two buttons may be formed from a converted piece, which has substantially flat skin side not permitting the making of a deep convex button surface adjacent the skin side;

Fig. 25 is a detail view showing a manner in which a convex front face of a button may be cut adjacent the skin side;

Fig. 26 is a view showing a converted piece having an article forming portion cut to a smaller diameter; and Fig. 27 is a detail view showing the manner in which the plural blank may be eccentrically arranged to secure the maximum yield.

In the manufacture of disks, or blanks for buttons, or the like, it is customary to employ a material composed largely of pieces, irregularly shaped on all faces or sides, and difficult to practically and accurately measure and classify. A material commonly used for this purpose is formed from the so-called "ivory" nut which, according to the common American method of manufacture, is required to be cut or sawed by skilled operatives. As an example, one of these nuts and the pieces cut therefrom are illustrated in Figs. 1 to 12 of the drawings. In this illustrated nut, a cut is usually made only approximately parallel with the natural flattened side of the nut to provide an irregularly shaped piece or slab 1 with a skin side $1^b$, and a sawed side $1^a$. The remaining portion of the illustrated nut is cut to provide four irregularly shaped pieces 2, 3, 4 and 5, with skin sides $2^b$, $3^b$, $4^b$ and $5^b$, respectively. These pieces contain a large portion of the soft central pithy part of the nut and to get rid of this undesirable part, the nut is sawed to provide flat sides $2^a$, $3^a$, $4^a$ and $5^a$, each of which is only approximately parallel with the skin side of the piece on which it is formed, thus giving pieces with a plurality of sawed sides. Heretofore, in nuts of the shape and size illustrated, it has been the custom to use pieces 1 for large buttons, such as those used on overcoats, while the pieces 2 to 5, inclusive, in order to obtain what has heretofore been considered the largest buttons from such pieces, have been classified by hand. This hand classification has been expensive, has not been accurate, and, in addition, has involved a great deal of waste, for the reason that, in the event of doubt as to the proper class of an irregularly shaped piece, it has been placed in the class from which a button of a smaller size would be produced.

From these irregularly shaped pieces, disks, or blanks for buttons, or the like, have been turned. In this turning operation, it has been common practice to gauge the irregularly shaped pieces from the sawed side as $4^a$ opposite the skin side $4^b$, so that the plane of the finished disk, or blank for buttons, or the like, is substantially parallel with this sawed side. By such a method, it is necessary, in many cases, to cut or remove a relatively large amount of the irregularly shaped piece adjacent the skin side $4^b$ in order to form the disk or blank, and, as the nut is hardest in immediate proximity to the skin and gradually gets softer until it becomes pithy at the center, the most desirable portion of the nut is wasted in such cases. Furthermore, in a very large number of instances, the irregularly shaped piece is of a thickness sufficient to produce two or more disks, or blanks, but this has not been taken advantage of to any great extent, owing to the fact that, when the irregularly shaped piece has been gauged from the sawed side, the plane of the disk, or blank, has rendered the securing of plural disks, or blanks impracticable in many cases.

In this old method, the gauging of the irregularly shaped piece has been effected by causing the gauging tool to cooperate with those portions of the irregularly shaped piece lying beyond the area of the proposed disk or blank and also beyond the path of operation of the cutting tool. This has required that the proposed disk or blank be cut to such a diameter that the gauging tool shall have sufficient material beyond the proposed disk or blank and the path of operation of the cutting tool with which to cooperate, thus preventing the securing of disks or blanks of maximum diameter from these irregularly shaped pieces.

According to this invention a rough mechanical classification of the irregularly shaped pieces is preferably made for size, as, for example, diameter and thickness, the irregularly shaped pieces of the different classes being then converted into pieces such as shown at $x$ in Figs. 20 and 21, still retaining the maximum possibilities in disks, or blanks for buttons, or the like, of the irregularly shaped pieces and preferably having a form which is mechanically and accurately measurable. In order that the converted pieces may be mechanically and accurately measurable for the maximum possibilities in disks, or blanks for buttons, or the like, each piece is provided with at least one definitely formed gauging surface, which may be either or both a cylindrical outer wall or perimeter $5^x$, or a transverse surface such as shown at $3^x$ on one side of the converted piece, as desired.

In making these converted or mechanically measurable pieces, it is preferred to gauge the irregularly shaped pieces from the skin side $4^b$ and within the area of the proposed converted piece $x$ and to operate the cutting tool 11, so that each mechanically measurable or converted piece $x$ has its plane substantially parallel with the plane of the skin side $4^b$.

By this new method, no material is required on the irregularly shaped piece beyond the area of the proposed converted piece $x$ by means of which to hold the irregularly shaped piece 4 during the cutting of the converted piece $x$, and, owing to the fact that the plane of the converted piece $x$ is substantially parallel with the plane of the skin side $4^b$ of the irregularly shaped piece 4, it is possible to obtain converted pieces $x$ which have the maximum diameters obtainable from the irregularly shaped pieces and also embody the maximum possibilities in numbers of disks, or blanks for buttons, or the like, for such maximum diameters one disk or blank of each converted piece being of superior quality, because it is in close proximity to the skin side, while the second is, in many instances, equal to the disks or blanks obtained by the old method.

Devices, which may be used for forming the converted pieces $x$, are illustrated in Figs 13 to 16, inclusive, and Figs. 18 and 19. These devices embody a gauging tool 6 having a plurality of equidistantly spaced gauging points 7, four in this instance, but preferably at least three, against which one of the irregularly shaped pieces 4 of the nut is placed, so that the skin side $4^b$ will cooperate with and engage the gauging points 7. For holding the irregularly shaped piece 4 against the gauging points 7, a holding tool 17 is provided, which has a substantially pointed end 24 adapted to cooperate with the sawed side $4^a$ of the irregularly shaped piece 4 at a point which is substantially at the center of the annular series of gauging points 7. This holding tool 17 is yieldingly movable in a head 8 in an axial direction, said head being secured at 10 to one end of a hollow shaft 9 turned in any suitable manner, and said shaft having therein a sleeve 20 in which a helical spring 19 is arranged. One end of this spring abuts a nut or collar 18 on the inner end of the tool 17, while the other end of the spring abuts an adjustable abutment 21 operating in the sleeve 20 and moved through an adjusting screw 22 turning in said sleeve 20. When the shaft 9 and head 8 are moved axially toward the gauging tool 6, the holding plunger or tool 17 moves with the head until the sawed side $4^a$ of the irregularly shaped piece 4 is engaged, after which the holding tool 17 yields axially in the head 8. The head 8 also carries a cutter 11 for cutting a circular perimeter on the proposed converted piece, this cutter 11 being in the form of a hollow tube secured in the head 8 about the holding tool 17 by screws 14 and having a plurality of diametrically arranged cutting points 13 at one end. It will be seen that this cutter, when operating through the irregularly shaped piece 4 will provide a converted or cylindrical piece $x$ whose plane will be substantially parallel with the general plane of the skin side $4^b$ of the irregularly shaped piece 4. If no other surface is to be formed on the converted piece $x$, then a piece, such as shown in Fig. 20, will be obtained with a skin side $1^x$, a sawed side $2^x$, and a cylindrical outer wall or perimeter $5^x$. This cylindrical outer wall or perimeter $5^x$ may be employed in suitable machinery for positively measuring as to maximum possibilities for disks, or button blanks, or the like, and when complete serves as the finished outer edge or perimeter of the buttons or other article to be produced, as illustrated in Figs. 22, 24 and 25. The most desirable surface on the converted pieces $x$ from which mechanical measurement can be made is a surface such as $3^x$ which extends transversely of the axis of the converted piece, and it has been also found that such surface may be in the form of a finished disk or blank surface. With the end in view of forming this surface $3^x$, a cutter 15 may be provided in the form of a flat blade with a cutting edge 16, shaped to form the finished surface $3^x$. In order to secure this blade in a fixed relation to the cutting tool 11, the latter is provided with two diametrically opposed slots 12 in which the opposite edges of the blade 15 are received and the holding tool 17 is provided with a longitudinally extending slot 23 receiving the blade 15. Screws $15^a$ secure the blade 15 in position. This cutting blade 15 advances with the cutting tool 11 toward the irregularly shaped piece 4 on the gauging tool 6, and the movement of this tool 15 toward the gauging points is predetermined to a fixed point, so that all of the converted pieces $x$ cut from a given class of irregularly shaped pieces 4 will have finished surfaces $3^x$ at a fixed distance from the gauging points 7, or the plane of the skin side $4^b$. This fixed distance is preferably such that two or more proposed disks, or blanks for buttons, or the like, may be cut from the converted piece $x$, as shown in Figs. 22 to 25, inclusive, by dividing such pieces transversely.

In cutting these converted pieces, the thickness of the pieces may, if desired, be the same for all of the different classes and in this event the surface opposed to the skin or superior side of the converted pieces is not always used as a finished article surface. This is especially true when thin blanks or buttons are to be produced, as it is desirable that all of the single disks or blanks be taken from the converted piece in as close proximity to the skin or superior side as possible. Such a result may be secured by removing the skin or superior side of the converted piece to provide thereon a finished article surface, and thereafter recutting the surface opposed to the skin side or superior side to produce in the converted piece the exact thickness desired.

Assuming that converted pieces $x$ are obtained each with a gauging surface $3^x$ extending transversely of its axis, then these pieces may at this time or later be submitted to a measurement for thickness in any suitable apparatus, which in reality will give classification for the curvature of the skin side $4^b$, so that this curved or skin side $4^b$ may be most advantageously utilized with respect to the shape of the articles to be produced. For instance, if the articles to be produced are buttons, then from those converted pieces $x$ having a deep convex skin side may be produced button blanks of maximum convex curvature on either face, as, for instance, illustrated in dotted line in Fig. 22, where the back convex face of a button is nearest to the skin side $1^x$, or, as illustrated in Fig. 25, where the front convex face is situated in closest proximity to the skin side $1^x$ of a converted piece $x$. Those converted pieces $x$ which have substantially flat skin sides may be utilized for flat or concave face buttons, as illustrated in Fig. 24. There are quality advantages to be gained, when using irregularly shaped pieces 4 cut from the so-called "ivory" nut, by having the surface contour of the finished article to be produced conform substantially with the contour of the skin surface of the nut.

Many of the converted pieces $x$ obtained by this method will have incomplete perimeters or be incomplete in one or more of the article forming portions, such as at $4^x$, Fig. 24, and, in order to secure from these converted pieces buttons or other articles free from such imperfection, the converted pieces which are incomplete in any respect may be separated from those which are complete and recut to a smaller diameter or size, as shown in Fig. 26. This separation may readily be made by hand but as all of the converted pieces $x$ are of regular and uniform shape they may and preferably are mechanically and accurately measured or classified by any suitable means for the maximum possibilities in disks, or blanks for buttons, or the like. Both the hand and mechanical methods of classification may be varied as desired to meet trade demands or for any other reason. For example, if it is desirable to produce disks, or blanks, of the greatest diameters, then this may be the controlling feature of the classification, or if it is more desirous to produce the maximum number of button blanks, then the classification may be designed with the maximum number of disks, or blanks, in view. The converted pieces after they have been mechanically and accurately measured are cut in accordance with such mechanical measurement, using machines that are known to the trade for this purpose. In order to secure the maximum yield from incomplete converted pieces these may be recut to form disks, or blanks, whose centers are eccentric with reference to the original converted piece $x$, as shown in Fig. 27. It is preferred in recutting the plural blanks with incomplete perimeters to first recut those portions with incomplete perimeters adjacent the skin or superior side to a smaller diameter and then to recut to a smaller diameter and thickness those portions of each plural blank with an incomplete perimeter adjacent the other side of the blank or the side opposite the skin or superior side.

In the production of buttons after the classification, the skin side $1^x$ of the converted piece $x$ is removed to provide a finished surface, shown in dotted lines in Figs. 22 to 25, inclusive, in close proximity to said skin side $1^x$. And in the case of plural blanks the proposed single disk or blank to be formed from the superior portion thereof or that portion adjacent the skin surface may be made thicker than the others in a certain part thereof, say the center, as shown in Fig. 25, or provided with some other distinguishing characteristic, by means of which these disks, or blanks may be readily separated during or after the dividing operation from those disks obtained from the other portions of the plural blank. The plural blanks are then divided to provide the number of single disks or blanks determined by the classification and in this dividing operation either or both of the interior faces may be placed upon the single disks or blanks, if desired.

From the foregoing description it will be seen that there has been provided a method of producing disks, or blanks for buttons, or the like, which has many advantages over any method heretofore known. Some of these advantages are: First, as a result of gauging from the skin side and cutting parallel with and in close proximity to this skin side, the possibilities in plural buttons have been tremendously increased. Second, through this method of gauging and cutting the quality of the product is greatly improved. Third, the classification of the converted piece for the curvature of the skin side further increases the quality of product as well as the size of the article obtained. Fourth, it is possible to control absolutely the positions within the converted piece of the articles to be produced, so that from each converted piece, the most desirable results are obtained. Fifth, the diameter of a converted piece obtained from an irregularly shaped piece may be the maximum for the piece, due to the fact that the irregularly shaped piece is gauged and supported within the area of the converted piece during the cutting operation. And sixth, a converted piece is provided which through its uniformity of shape and a finished surface thereon may be automatically and mechanically handled in the various operations of the method of producing the articles contained therein.

While the invention is herein described and illustrated in connection with irregularly shaped pieces formed from nuts, it is to be understood that some features of this invention are not limited to irregularly shaped pieces from such source.

What I claim as my invention and desire to secure by Letters Patent is:

1. In a method of producing disks, or blanks for buttons, or the like, from irregularly shaped material, the steps which consist in severing from such material, pieces having substantially regular and cylindrical characteristics but with more or less incomplete cylindrical edges, separating such cylindrical pieces with incomplete cylindrical edges from those having complete cylindrical edges and recutting said cylindrical pieces with incomplete cylindrical edges to provide cylindrical pieces having complete cylindrical edges, the circumference of each of which will substantially intersect the edge of the incomplete piece from which it is formed at the point of the smallest diameter of such piece.

2. In a method of producing disks, or blanks for buttons, or the like, from irregularly shaped nut pieces, each having a skin surface thereon and sawed surfaces not parallel therewith, the steps which consist in roughly classifying such nut pieces for size, establishing a base plane substantially parallel to the skin surface, and severing each irregularly shaped nut piece into a piece having substantially regular and cylindrical characteristics with an axis normal to said plane and still retaining substantially the maximum possibilities in disks, or blanks for buttons, or the like of the original irregularly shaped nut piece.

3. In a method of producing disks, or blanks for buttons, or the like, from nut pieces, each having a skin side thereon and sawed surfaces not parallel therewith, the steps which consists in roughly classifying such nut pieces for size, converting each nut piece into a piece still retaining the maximum possibilities in disks, or blanks for buttons, or the like, for the nut pieces in each class, with the axis of each of said converted pieces perpendicular to the plane of the skin surface of the nut piece.

4. In a method of producing disks, or blanks for buttons, or the like, from irregularly shaped pieces of material having superior quality adjacent one side thereof, the steps which consist in cutting the irregularly shaped pieces into pieces with circular perimeters, during such conversion providing on each of said converted pieces a formed surface on the side opposite the superior side and parallel therewith, thereafter removing the surface on the superior side to provide a finished surface thereon, and recutting the converted piece on the side opposite the superior side to provide a desired thickness.

5. In a method of producing disks, or blanks for buttons, or the like, from nut pieces each having a skin side and a plurality of sawed sides thereon, the steps which consist in roughly classifying the nut pieces for size, gauging such nut pieces from the skin side thereof and while so gauged converting the nut pieces into pieces still retaining the maximum possibilities in disks, or blanks for buttons, or the like, for each class of the nut pieces, and, during such conversion, placing a formed surface on each converted piece on the side opposed to the gauged side and parallel with the general plane of the gauged side.

6. In a method of producing disks, or blanks for buttons, or the like, from nut pieces each having a skin side and a plurality of sawed sides thereon, the steps which consist in roughly classifying such nut pieces for size, gauging such nut pieces each from the skin side within the area of a proposed piece to be formed, and converting each nut piece while so gauged into a piece still retaining the maximum possibilities in disks, or blanks for buttons, or the like, for the nut pieces in each class.

7. In a method of producing disks, or blanks for buttons, or the like, from irregularly shaped pieces of material, the steps which consist in severing from such irregularly shaped material, mechanically measurable pieces having substantially regular and cylindrical characteristics, mechanically and accurately measuring such pieces for the maximum possibilities in disks, or blanks for buttons, or the like, and cutting on each measured piece a finished button face having its perimeter substantially coincident with one end of the smallest diameter of such measured piece.

8. A method of producing disks, or blanks for buttons, or the like, from nut pieces, each having a skin side thereon, which consists in roughly classifying the nut pieces for size, gaging the nut pieces from the skin sides thereof and while so gaged converting such nut pieces into pieces still retaining the maximum possibilities in disks, or blanks for buttons, or the like, for each class of nut pieces, and having the skin of the nut on one side thereof, providing a finished surface on the side opposed to the skin side at a fixed distance from the gauging means and parallel with said gauging means, and later removing the skin side to provide a finished surface.

9. A method of producing disks, or blanks for buttons, or the like, from irregularly shaped pieces of material, which consists in gauging each irregularly shaped piece on one side within the area of a proposed converted piece, converting such irregularly shaped pieces into pieces retaining thereon the gauged surface, and, during such conversion, providing on each converted piece a formed surface on the side opposed to the gauged side, at a fixed distance from the gauging means, classifying the converted pieces for curvature of the gauged surface and forming a surface on the gauged side of each converted piece most advantageously adapted to its curvature.

10. A method of producing disks, or blanks for buttons, or the like, from nut pieces each having a skin side and a plurality of sawed sides thereon, which consists in roughly classifying the nut pieces for size, gauging the nut pieces from the skin side, each within the area of a proposed piece to be cut therefrom, converting the nut pieces while so gauged into pieces still retaining the maximum possibilities in disks, or blanks for buttons, or the like, for each class of the nut pieces and having the skin of the nut on one side thereof, and, during such conversion, providing a formed surface on the side of each converted piece opposite to the skin side and in a plane parallel with the general plane of such skin side, separating the converted pieces with incomplete perimeters from those with complete perimeters, recutting those converted pieces with incomplete perimeters to a smaller diameter and removing the skin side from all of the converted pieces to provide finished surfaces thereon.

11. In a method of producing disks, or blanks for buttons, or the like, from irregularly shaped pieces of material, the steps which consist in converting such material into pieces each having a plurality of article forming portions, separating the converted pieces with incomplete article forming portions from those with complete article forming portions, and recutting to the largest possible diameter each incomplete article forming portion of the blanks independently of the other article forming portions of the blanks without dividing the blanks.

12. In a method of producing disks, or blanks for buttons, or the like from irregularly shaped pieces of vegetable ivory the steps which consist in cutting the irregularly shaped pieces into plural blanks, the planes of which are approximately parallel with the skin face of the pieces, providing on said plural blanks circular perimeters, separating the plural blanks with incomplete perimeters in any portions thereof from those with complete perimeters, recutting those portions incomplete adjacent the skin face to a smaller diameter only, recutting those portions removed from the skin face to the best advantage and dividing the plural blanks transversely to obtain single disks or blanks.

13. In a method of producing disks, or blanks for buttons, or the like, from material which has superior quality adjacent one side thereof, the steps which consist in cutting the material to form plural blanks with circular perimeters, separating the plural blanks with incomplete article forming portions from those with complete article forming portions, recutting the incomplete portions of the plural blank to a smaller size, dividing the blanks transversely to provide single disks, or blanks for buttons, or the like, during some part of the method providing the single disks, or blanks, with physical characteristics which permit of mechanical separation and through such physical characteristics mechanically separating the single disks, formed from the superior portion of the plural blanks, from the single disks formed from the other portions.

14. In a method of producing disks, or blanks for buttons, or the like, from nut pieces, each having a skin side thereon, the steps which consist in roughly classifying the nut pieces for size, gauging the nut pieces each from the skin side thereof, converting each of such nut pieces while so gauged into a piece still retaining the maximum possibilities in disks, or blanks for buttons, or the like, for the nut pieces in each class, each piece having the skin of the nut on one side thereof, and a thickness sufficient to provide a plurality of disks, or blanks for buttons, or the like, and dividing the converted piece transversely to obtain the single disks, or blanks.

15. A method of producing disks, or blanks for buttons, or the like, from irregularly shaped pieces of material, which consists in converting such pieces into plural blanks, each retaining on one side an original surface of the irregularly shaped material and during such conversion providing on the opposite side a finished surface in a plane parallel with the general plane of original surface side, and by two separate steps removing the original surface side to form a finished surface, and dividing the plural blank transversely to obtain single disks, or blanks.

16. A method of producing disks, or blanks for buttons, or the like, from irregularly shaped pieces of material, which consists in gauging the irregularly shaped pieces on one side within the area of a proposed plural blank, converting such irregularly shaped pieces into plural blanks, each retaining the gauged surface thereon, and having a formed surface on the side opposite to the gauged surface, separating those blanks with incomplete article forming portions from those with complete article forming portions, recutting the incomplete article forming portions of each blank to a smaller size, removing the original surface side to form a finished surface thereon, and dividing each blank transversely to obtain single disks, or blanks.

17. In a method of producing disks, blanks for buttons, or the like, from irregularly shaped pieces of material, the steps which consist in severing from each irregularly shaped piece, blanks having substantially circular characteristics and a thickness sufficient to produce a plurality of buttons, measuring the blank by independent measuring operations adjacent each side thereof, and cutting in accordance with the measurements by separate cutting operations finished button faces on each side of the blank before dividing the same to obtain the plurality of buttons.

18. In a method of producing disks, or blanks for buttons, or the like, from irregularly shaped nut pieces, each having a skin side and a sawed side thereon, the steps which consist in roughly classifying such nut pieces for size and severing from such irregularly shaped nut pieces, pieces having substantially regular and cylindrical characteristics with cylindrical edges more or less incomplete for disks or blanks for buttons or the like, but still retaining substantially the maximum possibilities in disks, or blanks for buttons, or the like of the original irregularly shaped pieces, separating such cylindrical pieces with incomplete cylindrical edges from those having complete cylindrical edges, and recutting such cylindrical pieces with incomplete cylindrical edges into perfect cylindrical pieces.

19. In a method of reproducing disks, or blanks for buttons, or the like from irregularly shaped material, the steps which consist in severing from such material pieces having substantially regular and cylindrical characteristics, but with more or less incomplete cylindrical edges, separating such cylindrical pieces with incomplete cylindrical edges from those having complete cylindrical edges, and recutting such cylindrical pieces with incomplete cylindrical edges into perfect cylindrical pieces each having the largest diameter possible for each original incomplete piece.

20. In a method of producing disks or blanks for buttons or the like from nut pieces each having a skin surface thereon and sawed surfaces not parallel therewith, the steps which consist in roughly classifying the nut pieces for size, establishing a base plane substantially parallel to the skin surface, converting the nut pieces into pieces having substantially regular and cylindrical characteristics with an axis normal to said plane and still retaining substantially the maximum possibilities in disks, or blanks for buttons, or the like of the original nut pieces, and providing a formed surface on the side opposite the skin side and at a fixed distance from the skin side at the established plane.

21. In a method of producing disks or blanks for buttons or the like from nut pieces each having a skin side thereon, the steps which consist in converting such nut pieces into circular pieces more or less incomplete and during such conversion providing on the side opposite the skin side a finished surface at such a distance from the skin side that a plurality of disks or blanks for buttons or the like may be obtained between the skin side and the finished surface, and thereafter separating the incomplete circular pieces from the complete pieces, recutting the incomplete blanks into complete blanks, by two separate operations, providing finished surfaces on the skin sides of the complete blanks, and dividing the complete blanks transversely to obtain single disks or blanks.

22. In a method of producing disks, or blanks for buttons, or the like, from nut pieces, the steps which consist in roughly classifying such pieces for thickness, gauging and positioning each nut piece from the skin side thereof at substantially the perimeter of the proposed disk or blank for buttons or the like, and while so positioned, converting each nut into a piece having substantially regular and cylindrical characteristics and still retaining the maximum possibilities in disks or blanks for buttons, or the like, of the original nut pieces, each converted piece having a thickness sufficient to produce a plurality of disks, or blanks for buttons, or the like as determined by the thickness, classification and dividing such converted pieces transversely to obtain single disks, or blanks.

HENRY T. NOYES.